United States Patent Office 2,804,890
Patented Sept. 3, 1957

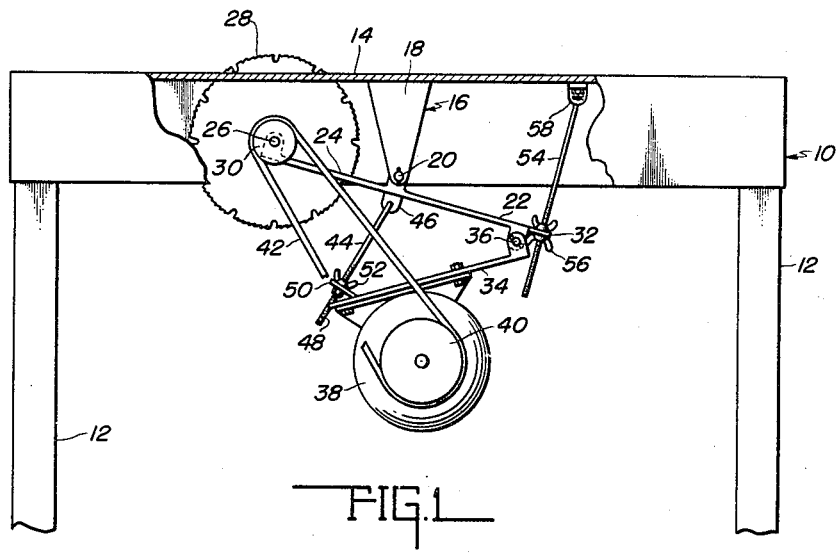
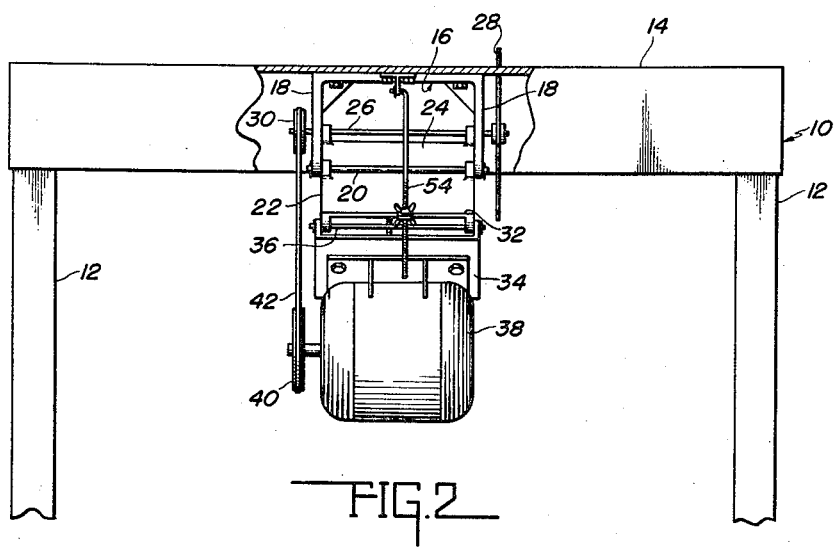

2,804,890
ADJUSTABLE POWER SAW MOUNTING

Elijah C. Fink, Marion, Ind.

Application September 26, 1955, Serial No. 536,543

1 Claim. (Cl. 143—35)

The present invention relates to a power saw and more particularly to a rotary saw capable of adjustment whereby different thicknesses of wood may be sawed.

It is an object of this invention to provide a rotary power saw mechanism which is simple in construction, reliable in operation and efficient in use.

It is still another object of this invention to provide a rotary power saw mechanism in which the operating parts of the mechanism are pivotally supported with respect to a stationary support whereby the depth of cut may be adjusted with facility and belt tension may be adjusted with equal facility without disturbing such depth of cut.

It is yet another object of this invention to provide a rotary power saw assembly wherein an integrated framework pivotally carried by a stationary support mounts both the rotary saw blade and the motor.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claim is not violated.

In the drawings:

Fig. 1 is a side elevation partly in section of one embodiment of this invention; and Fig. 2 is an end view partly in section of the embodiment of Fig. 1.

Referring to the drawings, a table or stationary support 10 composed of legs 12 and a table top 14 carry a depending supporting bracket 16 having two spaced supporting lugs 18 as shown more clearly in Fig. 2. A pivot pin or shaft 20 horizontally disposed and carried by the lower ends of the lugs 18 carry a saw frame or lever 22 for vertical swinging movement. On one end 24 of the saw frame is mounted a shaft 26 which carries the usual rotary saw blade 28 which extends through a suitable slot (not shown) in the table top 14. On the other end of the shaft 26 is a pulley 30, the purpose of which will become apparent from the following description.

On the opposite end 32 of the saw frame 22 is pivoted a motor platform 34 by means of a suitable pin 36. On the platform 34 is mounted a conventional electric motor 38 having a pulley 40 to which is connected a belt 42. As shown in the drawings, this belt 42 passes over the pulley 30 whereby the rotary motion of the motor may be imparted to the saw blade 28.

A belt-tensioning strut 44, which is composed essentially of a threaded, rigid rod is pivotally secured to an ear 46 on the frame 22, which is disposed opposite the pivot rod 20. The opposite end 48 of the strut 44 is passed through an apertured ear 50 on the motor platform 34 to be adjustably secured thereto by means of a suitable wing nut combination 52. It is now apparent that the angle between the saw frame 22 and the platform 34 may be varied or adjusted by means of the wing nut combination 52. In practice, the wing nut combination 52 is adjusted to a position that will separate the frame 22 and platform 34 sufficiently to properly tension the belt 42.

A second adjusting strut 54 is adjustably secured to the end 32 of the frame 22 by means of a wing nut combination 56, and is also pivotally secured to a lug 58 which depends from the under side of the table top 14. By adjusting the wing nut combination 56, the saw frame 22 as well as the motor platform 34 may be swung around the pivot 20 to vary the cutting depth of the saw blade 28. Viewing Fig. 1, by moving the frame 22 counterclockwise the sawing depth is reduced, whereas clockwise movement thereof will increase the cutting depth.

The mechanism including the saw blade 28 and motor 40, when adjusted, is properly integrated into a complete operating assembly which only needs to be adjusted in its entirety in order to to obtain the proper cutting depth. It is seen that as the assembly is moved, the motor 40 is also moved. However, this particular movement does not affect the tension of the belt 42.

What is claimed is:

A power saw of the character described comprising a saw-table having an opening therein through which a rotary saw-blade is adapted to project, a support carried on the underface of said saw-table, a frame having a linear configuration and horizontally pivoted intermediate its ends upon said support, a saw-blade mounted for rotation at one end of said frame and adapted to project through said table opening, an adjustable link carried by the underface of said saw-table and secured to the other end of the frame for determining the angle between the saw-table and the frame, a motor-carrying platform pivotally mounted at one of its ends upon said frame adjacent said other end of the frame, an adjustable strut extending between the other end of said platform and a point on said frame adjacent its pivotal mounting, the strut, the platform and the included portion of said frame thereby providing a triangular motor-supporting framework, and a belt drive connecting the motor to the saw blade whereby adjustment of said strut determines the angle between said support platform and said frame to establish the tension of the belt.

References Cited in the file of this patent
UNITED STATES PATENTS

| | | |
|---|---|---|
| 1,695,188 | Henkel | Dec. 11, 1928 |
| 2,008,673 | Ocenasek | July 23, 1935 |
| 2,067,652 | Tautz | Jan. 12, 1937 |
| 2,601,878 | Anderson | July 1, 1952 |
| 2,661,777 | Hitchcock | Dec. 8, 1953 |